US008516061B2

(12) United States Patent  
Seon

(10) Patent No.: US 8,516,061 B2  
(45) Date of Patent: Aug. 20, 2013

(54) SPAM CONTROL METHOD AND APPARATUS FOR VOIP SERVICE

(75) Inventor: Min Kyu Seon, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 12/822,433

(22) Filed: Jun. 24, 2010

(65) Prior Publication Data

US 2010/0332607 A1    Dec. 30, 2010

(30) Foreign Application Priority Data

Jun. 29, 2009 (KR) .................. 10-2009-0058031

(51) Int. Cl.  
*G06F 15/16* (2006.01)

(52) U.S. Cl.  
USPC ........................................................ 709/206

(58) Field of Classification Search  
USPC ...... 709/206; 370/252, 352, 392; 707/104.1; 726/13  
See application file for complete search history.

(56) References Cited

U.S. PATENT DOCUMENTS

| | | | | |
|---|---|---|---|---|
| 2007/0071200 A1* | 3/2007 | Brouwer | .................. | 379/142.05 |
| 2007/0118894 A1* | 5/2007 | Bhatia | ............................. | 726/13 |
| 2008/0084975 A1* | 4/2008 | Schwartz | .................... | 379/88.22 |
| 2008/0126088 A1* | 5/2008 | Satt et al. | ....................... | 704/233 |
| 2009/0034527 A1* | 2/2009 | Mathieu et al. | .............. | 370/392 |
| 2009/0106318 A1* | 4/2009 | Mantripragada et al. | .. | 707/104.1 |
| 2009/0180603 A1* | 7/2009 | I'Anson | .................... | 379/211.02 |
| 2009/0202061 A1* | 8/2009 | Charzinski et al. | ...... | 379/210.02 |
| 2010/0002686 A1* | 1/2010 | Rosenberg et al. | ........... | 370/352 |
| 2010/0064362 A1* | 3/2010 | Materna et al. | .................. | 726/15 |
| 2010/0161734 A1* | 6/2010 | Wang | ............................. | 709/206 |
| 2010/0226261 A1* | 9/2010 | Piche | ............................ | 370/252 |
| 2010/0329241 A1* | 12/2010 | Ryou et al. | ..................... | 370/352 |
| 2011/0289168 A1* | 11/2011 | Allam et al. | .................. | 709/206 |
| 2012/0039452 A1* | 2/2012 | Horn et al. | ..................... | 379/188 |

FOREIGN PATENT DOCUMENTS

WO   WO 2010066011 A1 *  6/2010

OTHER PUBLICATIONS

Takemori, K.; Nishigaki, M.; Takami, T.; Miyake, Y.; , "Detection of Bot Infected PCs Using Destination-Based IP and Domain Whitelists During a Non-Operating Term," Global Telecommunications Conference, 2008. IEEE Globecom 2008. IEEE , vol., No., pp. 1-6, Nov. 30, 2008-Dec. 4, 2008.*

So Young Park; Sung Hei Kim; Shin Gak Kang; , "Method of countering unsolicited IP applications using lists," Advanced Communication Technology, 2009. ICACT 2009. 11th International Conference on , vol. 02, No., pp. 1047-1049, Feb. 15-18, 2009.*

* cited by examiner

*Primary Examiner* — Imad Hussain  
(74) *Attorney, Agent, or Firm* — Jefferson IP Law, LLP

(57) ABSTRACT

A spam control method and apparatus for a user equipment capable of receiving a VoIP service are provided. The spam control method includes obtaining at least one IP address corresponding to a target domain name, creating a whitelist for spam control using the target domain name and obtained IP address, and performing, when a message is received, spam control by determining whether the received message is a spam message based on the whitelist.

16 Claims, 8 Drawing Sheets

FIG. 4

```
struct dns_list vDNS_LIST [MAX_DL]

ubyte domain_name [SZ_FQDN]              — 405 int count                                 — 410 int addr_type                             — 415 struct dns_record record [MAX_AR]

ubyte name [SZ_FQDN]                  — 420 ubyte addr [SZ_ADDR]                  — 425 ulong ttl                             — 430 ulong port                            — 435 ulong priority                        — 440 ulong weight                          — 445 ubyte addr_str [SZ_FQDN]              — 450
```

SPAM CONTROL METHOD AND APPARATUS FOR VOIP SERVICE

PRIORITY

This application claims the benefit under 35 U.S.C. §119 (a) of a Korean patent application filed on Jun. 29, 2009 in the Korean Intellectual Property Office and assigned Serial No. 10-2009-0058031, the entire disclosure of which is hereby incorporated by reference.

BACKGROUND OF THE INVENTION

1. Field of the Invention

The present invention relates to spam control in a Voice over Internet Protocol (VoIP) service. More particularly, the present invention relates to a spam control method and apparatus for a VoIP service that create a whitelist for spam control using IP addresses of target domains and identify and handle spam messages based on the whitelist.

2. Description of the Related Art

Voice over Internet Protocol (VoIP) in a network environment enables a service similar to a voice call service of a public switched telephone network. Recently, the VoIP, which interworks with Session Initiation Protocol (SIP) for session setup and registration, is actively used to implement various services. Security issues related to VoIP have increased.

More particularly, similar to email spamming, VoIP spamming may cause user inconvenience by transmitting unsolicited messages and calls. In the VoIP spamming using existing networks, a spammer may transmit an identical message to thousands of addresses at once at low cost. That is, spammers may abuse VoIP security vulnerabilities to transmit commercial advertisements or unsolicited messages at low cost.

Therefore, a need exists for a method and apparatus for efficiently blocking spam in a service based on VoIP interworking with SIP.

SUMMARY OF THE INVENTION

An aspect of the present invention is to address at least the above-mentioned problems and/or disadvantages and to provide at least the advantages described below. Accordingly, an aspect of the present invention is to provide a spam control method and apparatus for a Voice over Internet Protocol (VoIP) service that creates a whitelist for spam control using Internet Protocol (IP) addresses of target domains related to a user account, and identify and handle spam messages based on the whitelist.

Another aspect of the present invention is to provide a spam control method and apparatus for a VoIP service that can block spam messages in an environment where a user equipment may simultaneously access multiple Internet Service Providers (ISP) by dynamically maintaining an IP-table according to the results of a Service (SRV) query and response using a domain name before transmitting a registration request message to a specific ISP.

In accordance with an aspect of the present invention, a spam control method for a user equipment capable of receiving a VoIP service is provided. The method includes obtaining at least one IP address corresponding to a target domain name, creating a whitelist for spam control using the target domain name and obtained IP address, and performing, when a message is received, spam control by determining whether the received message is a spam message based on the whitelist.

In accordance with another aspect of the present invention, a spam control apparatus for a VoIP service is provided. The apparatus includes a user agent for specifying a target domain name, a query performer for obtaining at least one IP address corresponding to a specified target domain name, and a spam handler for creating a whitelist for spam control using the target domain name and obtained IP address, and for determining, when a message is received, whether the received message is a spam message based on the whitelist.

A whitelist for spam control may be created using IP addresses of target domains obtained by the user equipment and spam messages may be identified and handled based on the whitelist. VoIP spam message control may be performed at the network layer, as opposed to the session layer. Hence, a system load may be reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates a data structure declaration for a Domain Name System (DNS) list recording information collected by queries according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
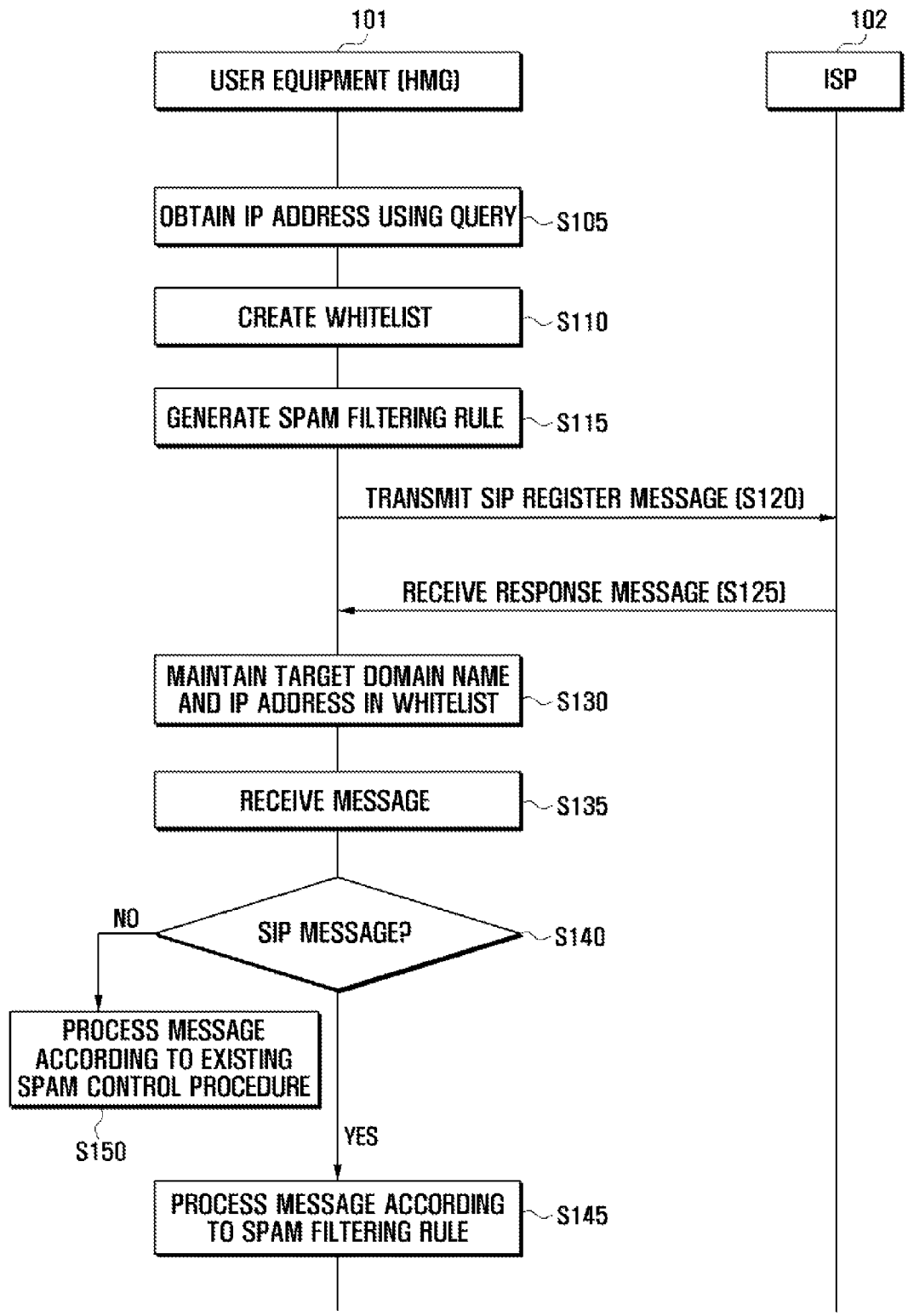
FIG. 1 is a sequence diagram illustrating a general procedure for Voice over Internet Protocol (VoIP) spam control according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a user equipment that handles VoIP spam messages. The VoIP spam messages are assumed herein to be a Home Media Gateway (HMG). Here, the HMG refers to a VoIP gateway device that receives packets carrying voice or fax data from an Internet Protocol (IP) network and forwards the received packets to terminals such as a phone and fax. The HMG may also refer to a terminal capable of receiving a VoIP service in a broad sense. It is readily understood by those skilled in the art that the user equipment may be any terminal comparable to the HMG.

Generally, blocking of VoIP spam may be based on content filtering, blacklists, or whitelists. Content filtering may use content analysis to identify and block spam, and is a widely used scheme for blocking email spam. However, content filtering may be inappropriate for spam calls because it may be impossible to identify the contents of a call in advance before the user actually answers the call. In addition, unreliable voice and video recognition may be difficult for determining spam through content analysis.

A spam blocking scheme based on a blacklist uses a prepared list of addresses of spammers. That is, data from a spammer in the blacklist is not received. However, the blacklist may be ineffective when spammers camouflage themselves with different addresses.

A spam blocking scheme based on a whitelist uses a list of allowed members or users. That is, conversely to the blacklist scheme, only data from a member in the whitelist may be received. However, the first data from an innocent sender not on the whitelist may not be received.

To solve the above problems, the user equipment according to an exemplary embodiment of the present invention creates a whitelist of IP addresses of Internet Service Providers (ISPs) (i.e., target domains) in the form of an IP-table. Thereafter, the user equipment transmits a registration request to the ISPs on the whitelist, and maintains only those Internet service providers on the whitelist that transmit a response to the registration request. Later, when a Session Initiation Protocol (SIP) message is received, the user equipment performs spam control using the whitelist. When a non-SIP message is received, the user equipment processes the received message according to an existing spam message control procedure. Using the above approach, VoIP spam control may be performed at a network layer, as opposed to a session layer.

FIG. 1 is a sequence diagram illustrating a general procedure for VoIP spam control according to an exemplary embodiment of the present invention. Here, it is assumed that a user equipment 101 uses a VoIP service and employs an SIP protocol for session setup and registration.

Referring to FIG. 1, before transmitting a register or invite message to an ISP 102, the user equipment 101 performs a query using a domain name of the ISP 102 (i.e., a target domain name), and obtains at least one IP address of the target domain in step S105. The user equipment 101 creates a whitelist for spam control based on the target domain name and obtained IP address in step S110.

The user equipment 101 creates a spam filtering rule in step S115. Here, the spam filtering rule refers to a spam message handling procedure based on the whitelist. For example, the spam filtering rule may result in a message from an IP address registered on the whitelist to be treated as a non-spam message, and may result in a message from an IP address not registered on the whitelist to be treated as a spam message.

The user equipment 101 transmits an SIP Register message to the ISP 102 to register itself with the server in step S120. Here, the user equipment 101 may transmit the SIP Register message using a representative one of the IP addresses obtained in step S105 because transmitting the SIP Register message to all the IP addresses obtained in step S105 may delay the registration procedure.

Upon reception of the SIP Register message, the ISP 102 accepting the registration request transmits a corresponding response message to the user equipment 101 in step S125.

Upon reception of the response message indicating acceptance of the registration request, the user equipment 101 keeps the target domain name and an associated IP address on the whitelist in step S130. When a response message is not received within a preset time or a response message indicating rejection of the registration request is received, the user equipment 101 may regard the target domain name and associated IP address as useless and remove them from the whitelist. As described above, because the user equipment 101 maintains only ISPs responding positively to a registration request on the whitelist, the user equipment 101 may clearly distinguish normal content providers from spammers.

The user equipment 101 creates a whitelist for VoIP spam control through steps S105 to S130. Thereafter, the user equipment 101 performs spam control in the following steps based on the created whitelist.

The user equipment 101 receives a message from the ISP in step S135. The user equipment 101 determines whether the received message is a SIP message in step S140. Whether the received message is a SIP message may be determined by comparing port information obtained through a query with the port information of the received message. When the received message is a SIP message, the user equipment 101 processes the received message according to the created spam filtering rule in step S145. When the received message is a non-SIP message, the user equipment 101 processes the received message according to an existing spam message control procedure in step S150.

Although not illustrated, the user equipment 101 may update the whitelist or remove a particular IP address from the whitelist. For example, when the existing ISP is replaced by a new ISP, it is necessary to remove the existing ISP from the whitelist.

Figure 2:
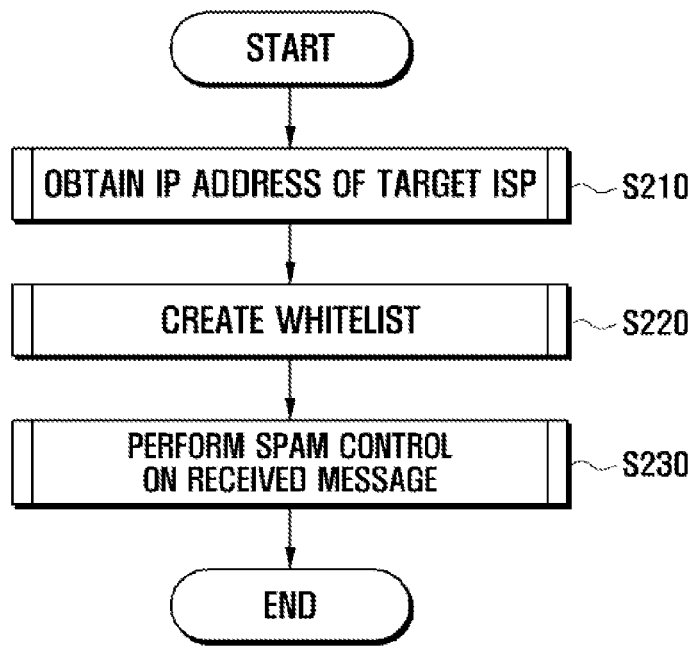
FIG. 2 is a flowchart of a VoIP spam control method including Internet Protocol (IP) address acquisition, whitelist creation, and spam message handling according to an exemplary embodiment of the present invention.

FIG. 2 is a flowchart of a VoIP spam control method including IP address acquisition, whitelist creation, and spam message handling according to an exemplary embodiment of the present invention.

Referring to FIG. 2, the user equipment 101 obtains an IP address of the target domain in step S210. Step S210 is depicted in more detail with reference to FIG. 3.

Figure 3:
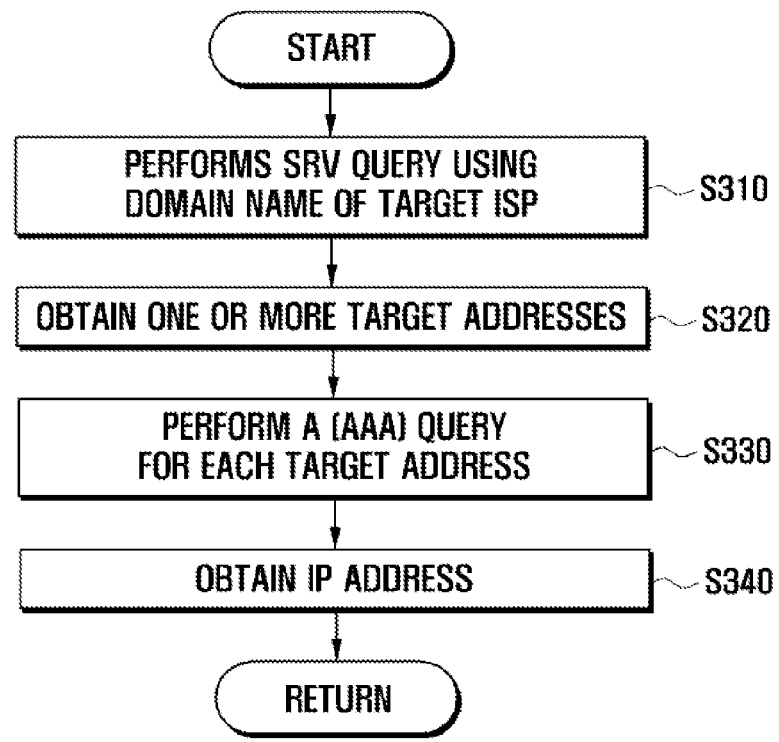
FIG. 3 is a flowchart illustrating a procedure for obtaining an IP address in the method of FIG. 2 according to an exemplary embodiment of the present invention.

FIG. 3 is a flowchart illustrating a procedure for obtaining an IP address in the method of FIG. 2 according to an exemplary embodiment of the present invention.

Referring to FIG. 3, the user equipment 101 performs a Service (SRV) query using a target domain name in step S310. A user equipment has to perform a Domain Name System (DNS) query to obtain an IP address of a particular target domain. A single ISP may utilize one or more IP addresses for the same domain name to achieve failover or load balancing between proxy servers. The SRV query is used to obtain at least one target address of a given domain name.

The user equipment 101 obtains at least one target address of the target domain name as a result of the SRV query in step S320.

The user equipment 101 performs a DNS query (i.e., an A query) for each obtained target address in step S330. The user equipment 101 obtains an actual IP address corresponding to each target address in step S340. During querying, the user equipment 101 may cache information for a given Time To Live (TTL) to prevent transfer of query messages to the network.

As described above, FIG. 3 depicts a procedure for obtaining an IP address corresponding to a particular domain name through querying. The user equipment 101 may collect additional information other than the IP address through querying, which is described in more detail with reference to FIG. 4.

FIG. 4 illustrates a data structure declaration for a DNS list recording information collected by queries according to an exemplary embodiment of the present invention.

Referring to FIG. 4, an entry of the DNS list is a structure that stores information regarding a Uniform Resource Locator (URL), a port, an IP address, priority, weight, and a TTL corresponding to a domain name of a given Internet service provider.

Figure 5:
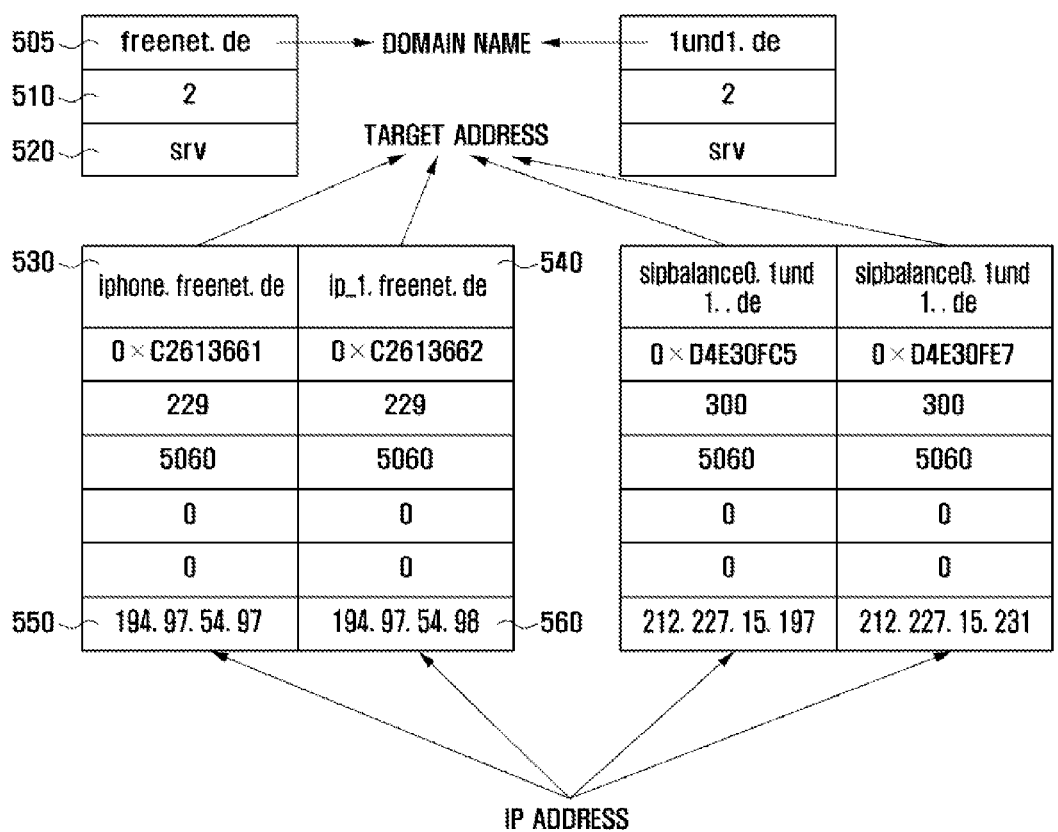
FIG. 5 illustrates an example of a DNS list created using data structures in FIG. 4 according to an exemplary embodiment of the present invention.

FIG. 5 illustrates an example of a DNS list created using data structures in FIG. 4 according to an exemplary embodiment of the present invention.

As described before, a single ISP may utilize one or more target addresses at the same time for the same domain name to achieve failover or load balancing between proxy servers.

Referring to FIG. 5, a domain name "freenet.de" 505 is associated with two target addresses "iphone.freenet.de" 530 and "ip_1.freenet.de" 540. That is, the user equipment 101 performs an SRV query using the target domain name "freenet.de" 505, and obtains the target addresses "iphone.freenet.de" 530 and "ip_1.freenet.de" 540 as results of querying.

Thereafter, the user equipment 101 performs an A query using the target address "iphone.freenet.de" 530, and obtains an actual IP address "194.97.54.97" 550 as a result of querying. In addition, the user equipment 101 performs an A query using the target address "ip_1.freenet.de" 540, and obtains an actual IP address "194.97.54.98" 560 as a result of querying.

The user equipment 101 creates a whitelist for spam handling using obtained IP addresses.

Referring back to FIG. 2, after the user equipment 101 obtains an IP address of a target domain in step S210, it creates a whitelist for spam handling using the obtained IP address in step S220. A whitelist creation procedure is described in more detail with reference to FIG. 6.

Figure 6:
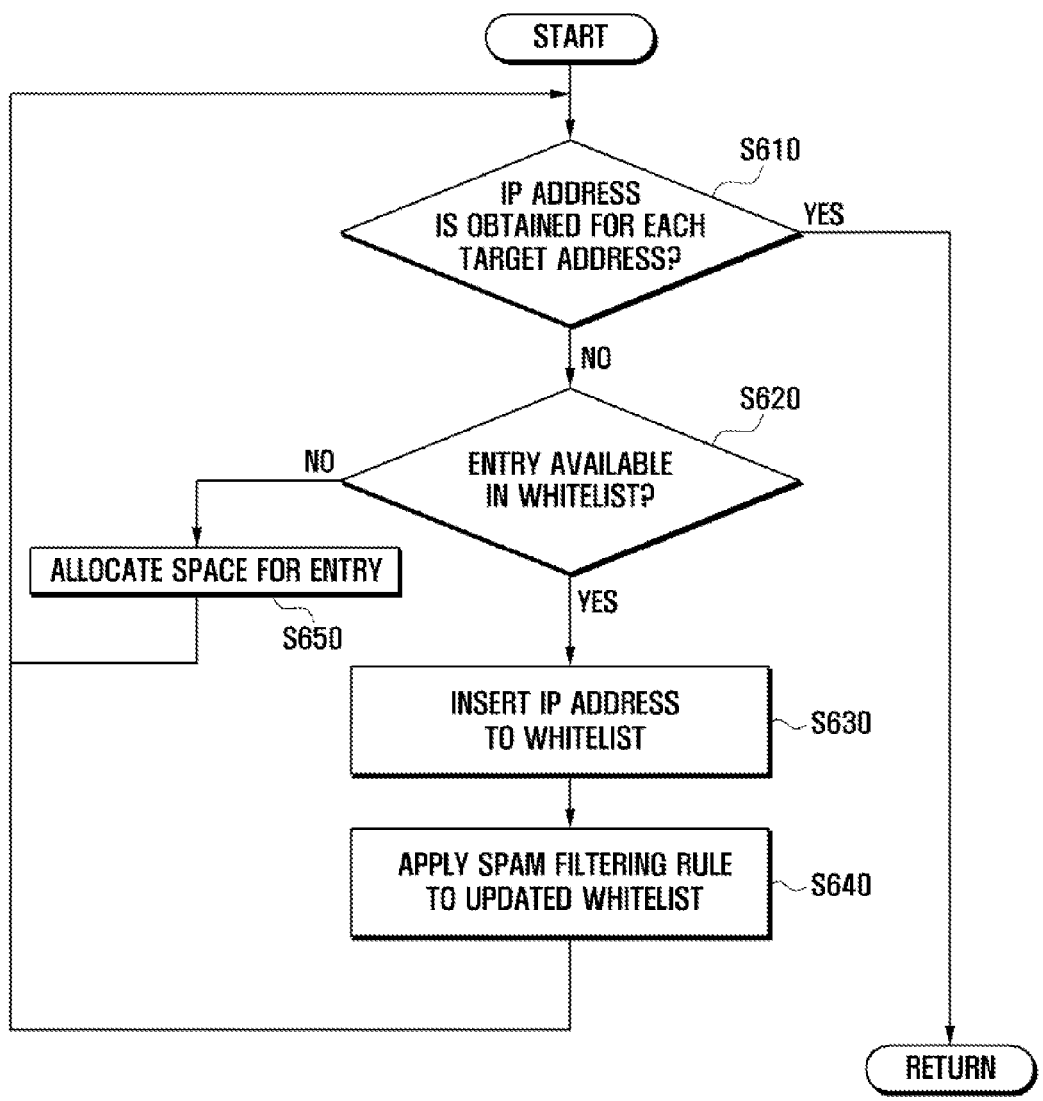
FIG. 6 is a flowchart illustrating a whitelist creation procedure in the method of FIG. 2 according to an exemplary embodiment of the present invention.

FIG. 6 is a flowchart illustrating a whitelist creation procedure in the method of FIG. 2 according to an exemplary embodiment of the present invention.

Referring to FIG. 6, the user equipment 101 determines whether an IP address is obtained for each target address in step S610. When an IP address is not obtained for each target address, the user equipment 101 determines whether an entry (i.e., storage space) is available in the whitelist in step S620. When an entry is not available in the whitelist, the user equipment 101 allocates storage space for an entry to the whitelist in step S650 and returns back to step S610.

When an entry is available in the whitelist, the user equipment 101 inserts the target domain name and associated IP address to the whitelist as an entry in step S630. The user equipment 101 applies the spam filtering rule to the updated whitelist in step S640. More specifically, a message from an ISP having an IP address in the updated whitelist is treated as a non-spam message.

Figure 7A:
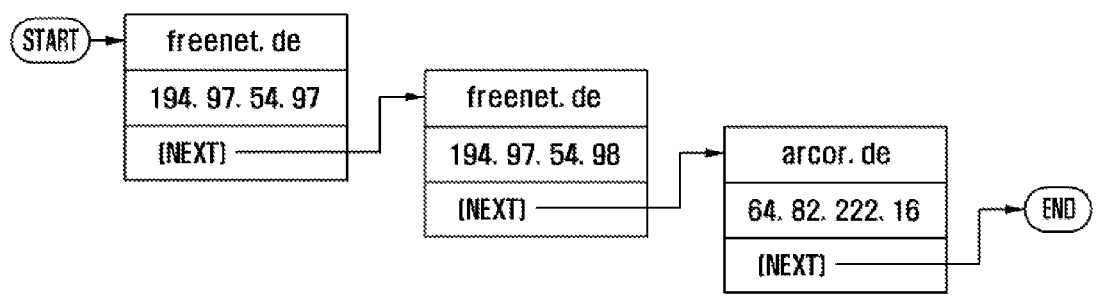
FIGS. 7A and 7B illustrate a whitelist created using the procedure of FIG. 6 according to an exemplary embodiment of the present invention.
Figure 7B:
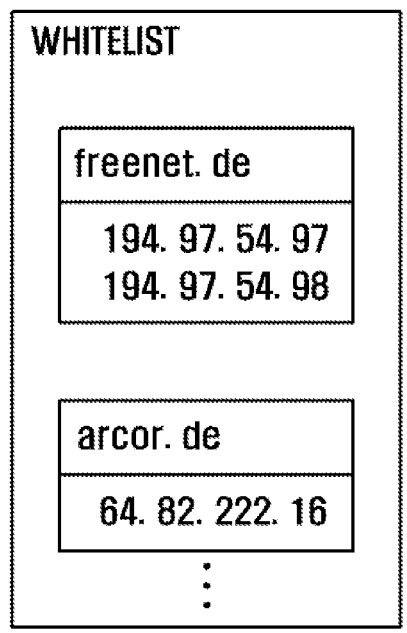

FIGS. 7A and 7B illustrate a whitelist created using the procedure of FIG. 5 according to an exemplary embodiment of the present invention.

Referring to FIG. 7A, the whitelist is in the form of a linked list having domain names and associated IP addresses. The user equipment 101 stores IP addresses of a particular domain obtained through querying in the whitelist. Later, a message from an IP address not on the whitelist is treated as a spam message and blocked.

The whitelist in FIG. 7B is in the form of a table having domain names and associated IP addresses. The whitelist in FIG. 7B is different in form from the whitelist in FIG. 7A, but is substantially identical in function to the whitelist in FIG. 7A.

Referring back to FIG. 2, after the user equipment 101 creates a whitelist for spam control in step S220, when a message is received from an ISP, it performs spam control using the whitelist in step S230. A spam message handling procedure is described in more detail with reference to FIG. 8.

Figure 8:
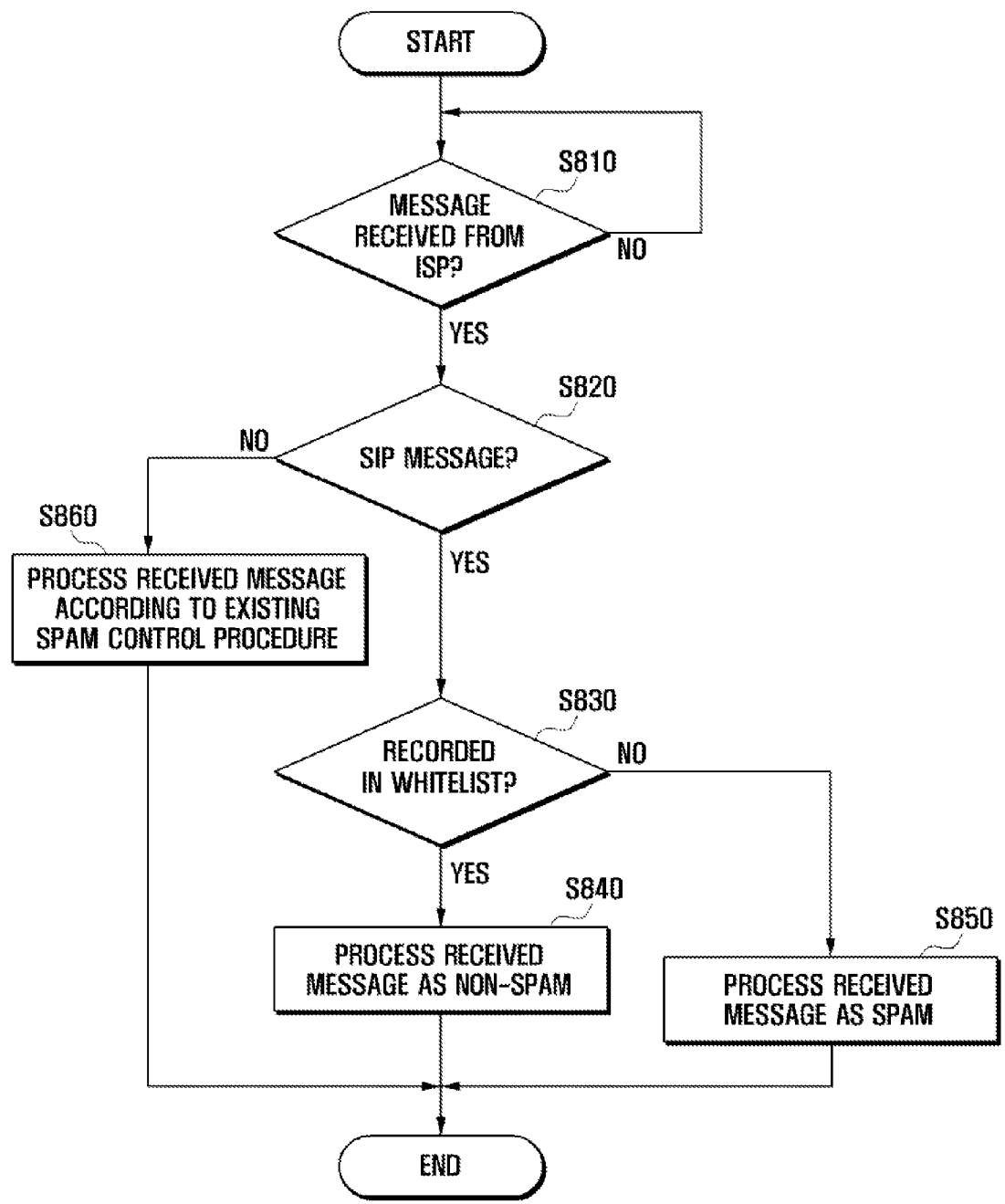
FIG. 8 is a flowchart illustrating a spam message handling procedure in the method of FIG. 2 according to an exemplary embodiment of the present invention.

FIG. 8 is a flowchart illustrating a spam message handling procedure in the method of FIG. 2 according to an exemplary embodiment of the present invention.

Referring to FIG. 8, the user equipment 101 receives a message or packet from an ISP in step S810. The user equipment 101 determines whether the received message is an SIP message in step S820. The user equipment 101 may determine whether the received message is an SIP message based on port information obtained together with a URL through an SRV query. That is, if the port number for SIP signaling is equal to the port number of a received message, the received message may be regarded as the SIP message. When the received message is the SIP message, the user equipment 101 determines whether the IP address of the ISP transmitting the message is present on the whitelist in step S830.

When the IP address of the ISP is present on the whitelist, the user equipment 101 processes the received message as a non-spam message in step S840. When the IP address of the ISP is not present on the whitelist, the user equipment 101 processes the received message as a spam message in step S850.

When the received message is a non-SIP message, the user equipment 101 processes the received message according to an existing spam message control procedure in step S860.

The above-described method performs VoIP spam message control at the network layer, as opposed to the session layer, thereby reducing a system load. This is described in connection with Table 1.

TABLE 1

| Layer 7 | Application | Netmeeting, Messenger |
| Layer 6 | Presentation | Codecs |
| Layer 5 | Session | SIP |
| Layer 4 | Transport | TCP/UDP |
| Layer 3 | Network | IP |
| Layer 2 | Data Link | Ethernet/PPP |

Table 1 shows the layers of the SIP protocol and IP protocol in a seven-layer Open System Interconnection (OSI) model. Generally, VoIP spam messages are handled at the session layer (i.e., layer 5). However, a procedure for spam checking for all received messages and packets at the session layer may increase the system load because of decapsulation up to layer 5. In an exemplary implementation, VoIP spam control is performed at the network layer (i.e., layer 3), thereby reducing the system load and increasing service quality.

Figure 9:
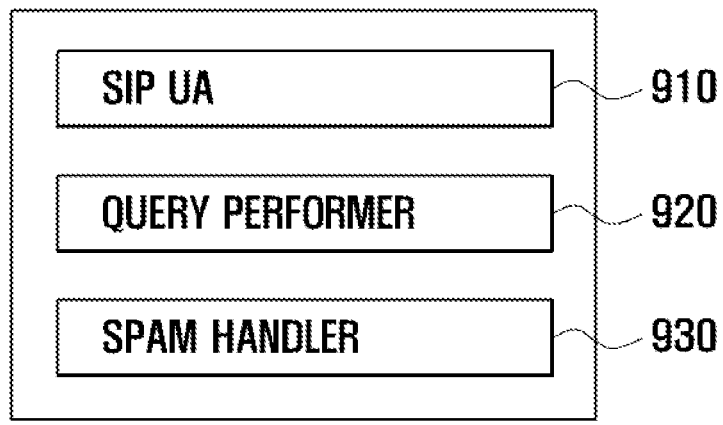
FIG. 9 is a block diagram of a user equipment according to an exemplary embodiment of the present invention.

FIG. 9 is a block diagram of a user equipment according to an exemplary embodiment of the present invention.

Referring to FIG. 9, the user equipment 101 includes a User Agent (UA) 910, a query performer 920, and a spam handler 930. The user agent 910 is an SIP UA that controls SIP protocol signaling in a VoIP service. More particularly, before transmitting a Register message or an Invite message to a particular target domain, to obtain the destination IP address, the UA 910 transmits a domain name of the target domain to the query performer 920 and receives an IP address corresponding to the target domain from the query performer 920.

The query performer 920 receives the domain name of the target domain from the UA 910, and performs a query to obtain a destination IP address. The query performer 920 may perform an SRV query to obtain a target address of the target domain, and perform an A query (i.e., an AAA query) to obtain an actual IP address corresponding to the target address. After obtaining the IP address corresponding to the target domain, the query performer 920 transmits the obtained IP address to the UA 910. Information that is collectable through querying is described in more detail with reference to FIGS. 4 and 5.

The spam handler 930 receives the domain name of the target domain and associated IP address from the UA 910. The spam handler 930 creates or updates a whitelist for spam control using the received domain name and associated IP address. The spam handler 930 applies a spam filtering rule to the updated whitelist. More specifically, when a new IP address is added to an existing whitelist, the spam handler 930 performs spam control according to the updated whitelist.

After creation of the whitelist, when a response message corresponding to a registration request message transmitted to a particular target domain is not received, the spam handler 930 may remove the target domain from the whitelist. This is because the target domain may reject the registration request from the user equipment 101.

The spam handler 930 may receive a message or packet from an ISP. The spam handler 930 determines whether the received message is an SIP message. Here, if the port number for SIP signaling is equal to the port number of the received message, the received message may be regarded as the SIP message.

When the received message is the SIP message, the spam handler 930 determines whether the received message is a spam message based on the whitelist. More specifically, when the IP address of the ISP is present on the whitelist, the spam handler 930 processes the received message as a non-spam message. When the IP address of the ISP is not present on the whitelist, the spam handler 930 processes the received message as a spam message.

Exemplary embodiments of the present invention provide VoIP spam message control that is performed at the network layer (i.e., layer 3) rather than the session layer. Thereby, a system load is reduced.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A spam control method for a user equipment capable of receiving a Voice over Internet Protocol (VoIP) service, the method comprising:
    obtaining at least one IP address corresponding to a target domain name;
    creating a whitelist for spam control using the target domain name and obtained IP address;
    performing, when a message is received, spam control by determining whether the received message is a spam message based on the whitelist;
    transmitting, after creating the whitelist, a registration request message to a target domain recorded on the whitelist to register the user equipment with the target domain;
    maintaining, when a response message corresponding to the registration request message is received, the domain name and an associated IP address of the target domain on the whitelist; and
    removing, when a response message corresponding to the registration request message is not received, the domain name and the associated IP address of the target domain from the whitelist.

2. The method of claim 1, wherein the registration request message is transmitted to a target domain associated with a selected one of one or more IP addresses.

3. The method of claim 1, wherein the obtaining of the at least one IP address comprises:
    obtaining at least one target address corresponding to the target domain name; and
    obtaining, for each obtained target address, an IP address corresponding to the target address.

4. The method of claim 1, wherein the creating of the whitelist for spam control comprises:
    determining, when the IP address is not yet obtained for each target address, whether an entry is available in the whitelist;
    creating an updated whitelist by adding the domain name and corresponding IP address to the whitelist as an entry; and
    applying a spam filtering rule to the updated whitelist.

5. The method of claim 1, wherein the performing of the spam control comprises:
    determining, when a message is received from an Internet Service Provider (ISP), whether the received message is a Session Initiation Protocol (SIP) message; and
    determining, when the received message is a SIP message, whether the domain name and the IP address of the ISP are present on the whitelist.

6. The method of claim 5, wherein the SIP message in the received message is determined by comparing port information obtained through a query with the port information of the received message.

7. The method of claim 5, wherein the performing of the spam control further comprises:
    treating the received message as a non-spam message when the domain name and the IP address are present on the whitelist; and
    treating the received message as the spam message when the domain name and the IP address are not present on the whitelist.

8. The method of claim 1, wherein the target domain comprises a domain of an Internet Service Provider (ISP).

9. A spam control apparatus for a Voice over Internet Protocol (VoIP) service, the apparatus comprising:
- a user agent for specifying a target domain name;
- a query performer for obtaining at least one IP address corresponding to a specified target domain name; and
- a spam handler, including a receiver, for creating a whitelist for spam control using the target domain name and the obtained IP address, and for determining, when a message is received, whether the received message is a spam message based on the whitelist,
- wherein the spam handler transmits a registration request message to a target domain recorded on the whitelist, and maintains, when a response message corresponding to the registration request message is received, the domain name and an associated IP address of the target domain on the whitelist, and
- wherein the spam handler removes, when a response message corresponding to the registration request message is not received, the domain name and the associated IP address of the target domain from the whitelist.

10. The apparatus of claim 9, wherein the spam handler transmits a registration request message to a target domain associated with a selected one of one or more IP addresses.

11. The apparatus of claim 9, wherein the query performer obtains at least one target address corresponding to the target domain name.

12. The apparatus of claim 11, wherein the query performer obtains, for each obtained target address, an IP address corresponding to the target address.

13. The apparatus of claim 11, wherein the spam handler determines, when a message is received from an Internet Service Provider (ISP), whether the received message is a Session Initiation Protocol (SIP) message, and determines, when the received message is a SIP message, whether the domain name and the IP address of the ISP are present on the whitelist.

14. The apparatus of claim 13, wherein the SIP message in the received message is determined by comparing port information obtained through the query performer with the port information of the received message.

15. The apparatus of claim 13, wherein the spam handler treats the received message as a non-spam message when the domain name and the IP address are present on the whitelist, and treats the received message as a spam message when the domain name and the IP address are not present on the whitelist.

16. The apparatus of claim 9, wherein the target domain comprises a domain of an Internet Service Provider (ISP).

* * * * *